United States Patent
De Rosa

(10) Patent No.: US 8,624,774 B2
(45) Date of Patent: Jan. 7, 2014

(54) METHOD AND SYSTEM OF LOCATING OBJECTS

(75) Inventor: Luca De Rosa, Colombier (CH)

(73) Assignee: The Swatch Group Research and Development Ltd, Marin (CH)

( * ) Notice: Subject to any disclaimer, the term of this patent is extended or adjusted under 35 U.S.C. 154(b) by 284 days.

(21) Appl. No.: 13/050,626

(22) Filed: Mar. 17, 2011

(65) Prior Publication Data

US 2011/0228820 A1     Sep. 22, 2011

(30) Foreign Application Priority Data

Mar. 17, 2010   (EP) ..................... 10156749

(51) Int. Cl.
  *G01S 13/74*   (2006.01)
  *G01S 13/08*   (2006.01)
  *G01S 13/00*   (2006.01)
  *G01S 3/02*    (2006.01)

(52) U.S. Cl.
  USPC ............... 342/42; 342/44; 342/118; 342/126; 342/127; 342/146; 342/175; 342/450

(58) Field of Classification Search
  USPC ......... 342/27, 42, 44, 51, 118, 126, 127, 146, 342/147, 175, 378, 450, 451, 458, 461, 463, 342/464, 465; 340/539.1, 539.11, 539.13, 340/539.14, 539.15, 568.1, 573.1, 686.6; 368/10, 11, 14, 238, 327
  See application file for complete search history.

(56) References Cited

U.S. PATENT DOCUMENTS 4,675,656 A * 6/1987 Narcisse ................... 340/539.21
4,985,878 A * 1/1991 Yamada et al. ................ 368/88

(Continued)

FOREIGN PATENT DOCUMENTS

DE    102 37 605 A1   3/2004
EP    1 630 966 A1    3/2006

(Continued)

OTHER PUBLICATIONS

Pletcher N M et al: "A 2GHz 52¼ W Wake-Up Receiver with—72dBm Sensitivity Using Uncertain-IF Architecture," Solid-State Circuits Conference, 2008. ISSCC 2008. Digest of Technical Papers. IEEE Internatinal, IEEE, Piscataway, NJ, USA, Feb. 3, 2008, pp. 524-633, XP031440532 ISBN: 978-1-4244-2010-0.

(Continued)

*Primary Examiner* — Jack W Keith
*Assistant Examiner* — Peter Bythrow
(74) *Attorney, Agent, or Firm* — Griffin & Szipl, P.C.

(57) ABSTRACT

The invention concerns a method and system of locating objects by means of UWB signals, the system including a search device (D1), incorporated in a portable apparatus (11) and provided with a pair of antennae (A1, A2), and at least one target device (D2) attached to an object sought (12). The target device (D2) includes, in addition to the transceiver (34, 35), a very low power consumption wake up receiver (46) which, when the target device is in a standby state, can receive a UWB wake up signal to switch on said device. This target device is arranged for measuring a time difference (tdiff) between the respective receptions of two locating signals respectively emitted by the two antennae (A1, A2) of the search device and for transmitting said time difference in a return signal that further contains, in a preferred variant, a signal processing time (trproc). Thus, it is not necessary for the two devices to be synchronized. Preferably, the search device (D1) is incorporated in a wristwatch (11) the two hands (51, 52) of which are used for indicating the direction or possible directions of the object sought (12).

10 Claims, 6 Drawing Sheets

(56) References Cited

U.S. PATENT DOCUMENTS

| | | | | |
|---|---|---|---|---|
| 5,262,763 A * | 11/1993 | Okuyama et al. | | 345/87 |
| 5,272,324 A * | 12/1993 | Blevins | | 235/462.44 |
| 5,414,427 A * | 5/1995 | Gunnarsson | | 342/51 |
| 5,572,192 A * | 11/1996 | Berube | | 340/574 |
| 5,652,570 A * | 7/1997 | Lepkofker | | 340/573.4 |
| 5,726,630 A * | 3/1998 | Marsh et al. | | 340/10.2 |
| 5,889,737 A * | 3/1999 | Alameh et al. | | 368/204 |
| 6,010,242 A * | 1/2000 | Ho | | 368/281 |
| 6,084,517 A * | 7/2000 | Rabanne et al. | | 340/573.4 |
| 6,150,921 A * | 11/2000 | Werb et al. | | 340/10.1 |
| 6,158,884 A * | 12/2000 | Lebby et al. | | 368/282 |
| 6,243,025 B1 * | 6/2001 | Yamagata et al. | | 340/903 |
| 6,483,427 B1 * | 11/2002 | Werb | | 340/10.1 |
| 6,523,752 B2 * | 2/2003 | Nishitani et al. | | 235/462.44 |
| 6,600,443 B2 * | 7/2003 | Landt | | 342/42 |
| 6,788,199 B2 * | 9/2004 | Crabtree et al. | | 340/539.13 |
| 6,812,824 B1 * | 11/2004 | Goldinger et al. | | 340/10.1 |
| 7,119,736 B2 * | 10/2006 | Heide et al. | | 342/125 |
| 7,148,801 B2 * | 12/2006 | Crabtree et al. | | 340/539.13 |
| 7,253,717 B2 * | 8/2007 | Armstrong et al. | | 340/10.2 |
| 7,570,938 B2 * | 8/2009 | Kwon | | 455/404.1 |
| 7,646,330 B2 * | 1/2010 | Karr | | 342/44 |
| 7,728,713 B2 * | 6/2010 | Stewart | | 340/10.4 |
| 7,812,719 B2 * | 10/2010 | Djuric et al. | | 340/539.13 |
| 8,044,797 B2 * | 10/2011 | Brommer et al. | | 340/539.32 |
| 2002/0008656 A1 * | 1/2002 | Landt | | 342/42 |
| 2002/0030094 A1 * | 3/2002 | Curry et al. | | 235/375 |
| 2002/0044058 A1 * | 4/2002 | Heinrich et al. | | 340/572.1 |
| 2002/0084904 A1 * | 7/2002 | De La Huerga | | 340/573.1 |
| 2002/0089434 A1 * | 7/2002 | Ghazarian | | 340/988 |
| 2003/0034887 A1 * | 2/2003 | Crabtree et al. | | 340/539 |
| 2003/0058155 A1 * | 3/2003 | Landt | | 342/42 |
| 2003/0174086 A1 * | 9/2003 | Hirt | | 342/42 |
| 2004/0080421 A1 * | 4/2004 | Wunderlich | | 340/573.4 |
| 2004/0085207 A1 * | 5/2004 | Kreiner et al. | | 340/572.1 |
| 2004/0140898 A1 * | 7/2004 | Reeves | | 340/573.1 |
| 2004/0212494 A1 * | 10/2004 | Stilp | | 340/539.1 |
| 2005/0007251 A1 * | 1/2005 | Crabtree et al. | | 340/539.13 |
| 2005/0012653 A1 * | 1/2005 | Heide et al. | | 342/42 |
| 2005/0200478 A1 * | 9/2005 | Koch et al. | | 340/539.13 |
| 2005/0206555 A1 * | 9/2005 | Bridgelall et al. | | 342/127 |
| 2005/0264416 A1 * | 12/2005 | Maurer | | 340/539.13 |
| 2006/0007049 A1 * | 1/2006 | Nitzan et al. | | 343/904 |
| 2006/0012464 A1 * | 1/2006 | Nitzan et al. | | 340/10.1 |
| 2006/0033662 A1 * | 2/2006 | Ward et al. | | 342/465 |
| 2006/0038676 A1 * | 2/2006 | Richards | | 340/539.23 |
| 2006/0046687 A1 * | 3/2006 | Kwon | | 455/404.1 |
| 2006/0202822 A1 * | 9/2006 | Finlayson | | 340/541 |
| 2007/0126623 A1 * | 6/2007 | Workman | | 342/126 |
| 2008/0136644 A1 * | 6/2008 | McCorkle | | 340/572.3 |
| 2008/0143482 A1 * | 6/2008 | Shoarinejad et al. | | 340/10.1 |
| 2008/0157970 A1 * | 7/2008 | Single et al. | | 340/572.1 |
| 2008/0165059 A1 * | 7/2008 | Karr | | 342/378 |
| 2008/0204322 A1 * | 8/2008 | Oswald et al. | | 342/465 |
| 2010/0321245 A1 * | 12/2010 | Aoki | | 342/458 |
| 2012/0229322 A1 * | 9/2012 | Mostov | | 342/22 |

FOREIGN PATENT DOCUMENTS

| | | |
|---|---|---|
| WO | 2006/098791 A2 | 9/2006 |
| WO | 2009/040699 A1 | 4/2009 |

OTHER PUBLICATIONS

Search Report issued in the corresponding European application No. 10156749, completed Sep. 8, 2010.

* cited by examiner

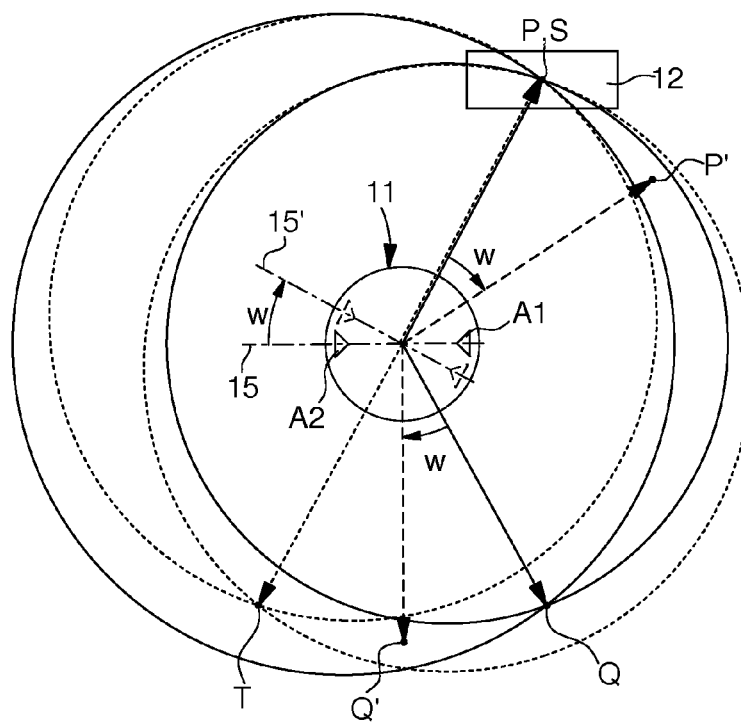
Fig. 4
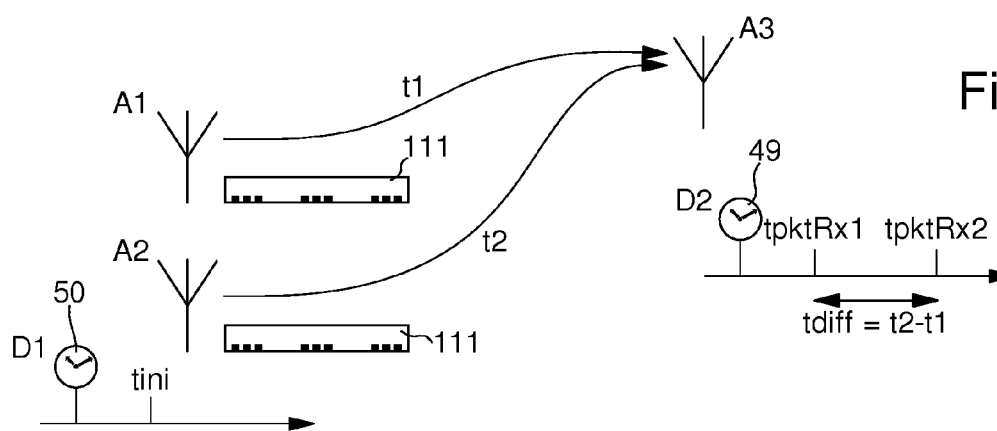
Fig. 5
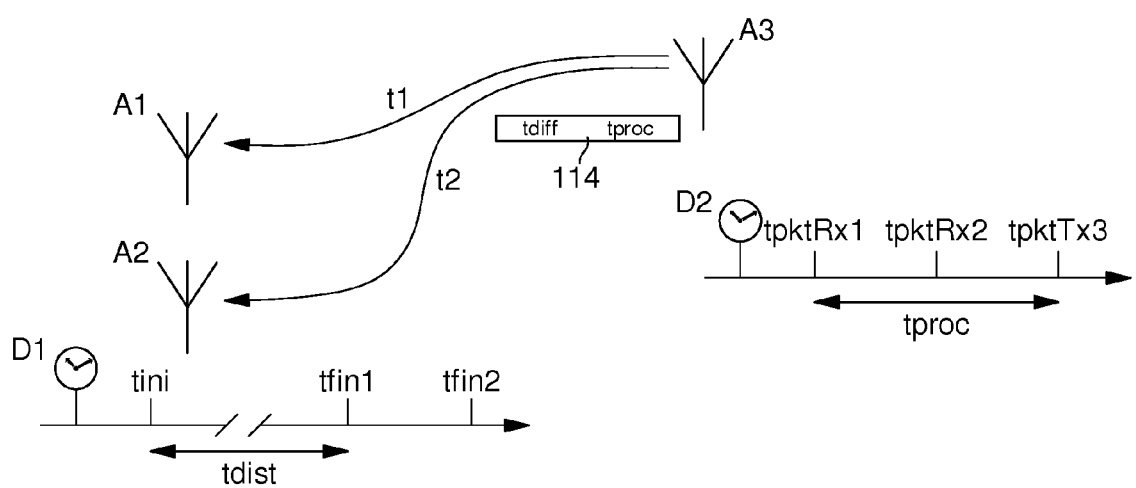

METHOD AND SYSTEM OF LOCATING OBJECTS

This application claims priority from European Patent Application No. 10156749.3 filed 17.03.2010, the entire disclosure of which is incorporated herein by reference.

FIELD OF THE INVENTION

The present invention concerns a method of determining the location of an object sought by means of electromagnetic signals exchanged between a search device, incorporated in a portable object, and a target device attached to the object sought, wherein the search device includes a transceiver associated with a pair of antennae spaced apart from each other, display means, electronic means for managing the transceiver and the display means, and manual control means, and wherein the target device includes a transceiver associated with an antenna and with electronic means capable of detecting the reception of signals originating from the search device and responding with signals representing the identity of the target device.

BACKGROUND OF THE INVENTION

People misplace commonly used objects, or especially forget where they have left them, for example in a home or place of work. If the object is small, such as a set of keys or glasses, it may be difficult to find and the search may take a long time. This is why various wireless transmission location systems have already been proposed. The present invention proposes the use of wireless UVB (Ultra Wide Band) technology in a system of this type. The main advantages of using this technology in short distance location of objects are mentioned in US Patent Application 2006/0033662. However, to date, UWB signals used in these applications had to be combined with narrow band radiofrequency signals.

US Patent Application No. 2008/0136644 discloses in detail a system of searching for and locating objects including identification tags which contain both narrow band RF circuits and UWB circuits. This system notably enables the distance between a local search device and an object sought to be measured using UWB technology, by measuring the return travel time of the signals. This document specifies that UWB technology enables relatively short distances to be measured with sufficient precision to locate objects, typically precision on the order of a decimetre or even a centimeter. However, the proposed system involves quite a complex structure and also requires a synchronisation operation to be performed between the search device and the tags for each search.

Another system using UWB signals for short distance object location is disclosed in EP Patent Application No 1 630 966 and one of the embodiments thereof has the features set out in the above preamble. This system is mainly intended for searching for a person who has a mobile terminal, for example a telephone, which constitutes the object sought and the target device within the meaning of the above description. The search method includes two successive phases. The first comprises responding to an emergency call, for example from the mobile terminal, by generally locating the mobile terminal, for example by means of GPS, and sending a rescue team to the location. The second phase comprises short distance location, generally to find victims, and uses the exchange of UWB signals between the mobile terminal sought and the search device held by the rescue crew, as explained below.

The mobile terminal emits characteristic UWB signals on demand, either by manual pressure on a key, or automatically in response to a location request, sent for example by short text message, or in response to detection of a dangerous situation by the terminal itself. To locate the mobile terminal using UWB signals, the search device includes four antennae arranged at the points of a rhombus and associated in pairs with an electronic circuit that measures the differences in the UWB signal reception time in each pair of antennae. From these measurements, the search device calculates the orthogonal coordinates of the mobile terminal relative to the frame of reference defined by the four antennae, then the polar coordinates (azimuth and distance) and displays the latter by means of a hand and a digital display.

The system disclosed in the aforecited document EP 1 630 966 cannot easily be applied to searching for misplaced objects, since the mobile terminal, which cannot be manually activated in such case, becomes too complicated to take the form of a tag, for example, and to have a standby mode with almost zero power consumption. Another drawback results from the need for four antennae placed at the points of a rhombus, which means the search device must have a relatively large volume.

SUMMARY OF THE INVENTION

It is an object of the present invention to provide a method and system of locating an object that substantially avoid the drawbacks of the prior art. According to the objectives of the invention, the target device should be able to be made small enough to be discreetly associated with the object concerned, for example in the form of a wafer or adhesive label. The target device should be able to be switched on to respond to the search device with no action apart from receiving signals from the search device. It is another object of the invention to combine the search device with a portable electronic apparatus, some of whose components said device uses, so as to achieve a high level of miniaturisation and to allow the user to have the search device constantly available and carry it without any inconvenience.

The present invention concerns a location method as defined in the independent claim(s). Various dependent claims define particular modes of implementing the method according to the invention.

By combining exclusively UWB transmission with the use of a UWB wake-up signal for actuating the target device, it becomes possible to keep the latter in standby mode for a very long period of time, typically several years, using a small quantity of electrical energy. The target device, using a single frequency band and a single UWB antenna may be made in a much more reduced form that in the prior art, and can be attached to small objects, such as keyrings, a wallet or glasses. The power consumption of the search device is also notably reduced. In combination with the use of a single pair of antennae, of small size and separated by only a few centimeters given the very high frequency of the UWB signals, this allows the search device to be incorporated in a portable apparatus of small size, particularly a mobile telephone or watch.

In a particular embodiment, the invention advantageously enables the search device to be housed in a wristwatch case of normal size and the time display members to be used to indicate the position of the object sought. This is how the user, wearing his watch as usual, will immediately have the search device available when he needs it.

Other features and advantages of the invention will appear below in the description of various embodiments, given by way of non-limiting example with reference to the annexed drawings.

BRIEF DESCRIPTION OF THE DRAWINGS

FIG. 4 shows schematically successive steps in the location method, in an operating mode wherein the search device is rotated.

FIG. 5 shows schematically two successive phases of a locating sequence by UWB signal exchange between the search device and the target device.

DETAILED DESCRIPTION OF VARIOUS EMBODIMENTS

Figure 1:
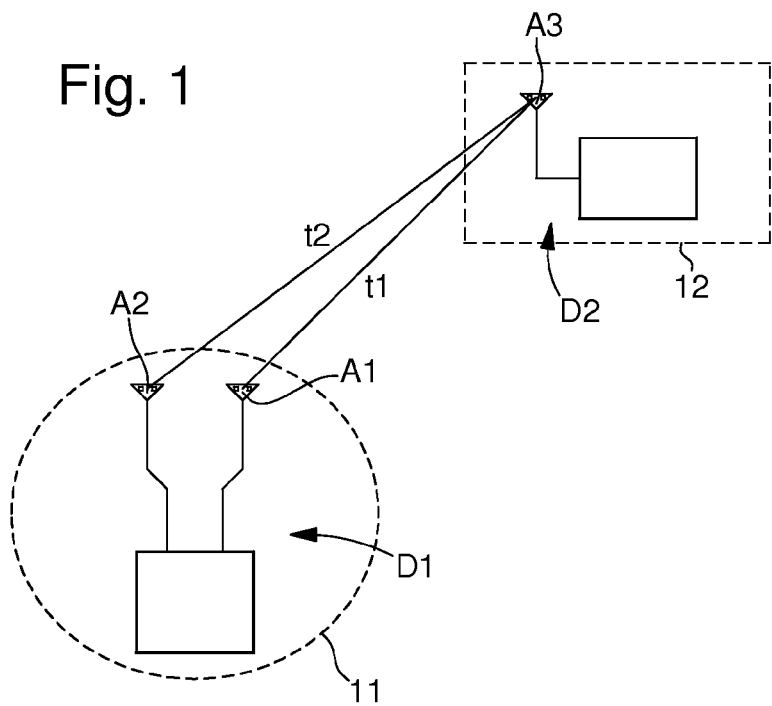
FIG. 1 shows schematically two elements forming the basis of the location system, namely a search device D1 incorporated in a portable device and a target device D2 attached to an object sought.

The object location system shown very schematically in FIG. 1 includes a search device D1 and at least one target device D2. Search device D1 is incorporated in a portable apparatus 11 and includes a UWB transceiver, provided with two antennae A1 and A2. Target device D2 is attached to an object 12, for example a set of keys, and includes a UWB transceiver, provided with an antenna A3. The drawing further shows that in most of the respective positions of devices D1 and D2, the distance between antennae A1 and A3 differs from that between antennae A2 and A3, thus the respective UWB signal travel times t1 and t2 over these distances are different.

Figure 2:
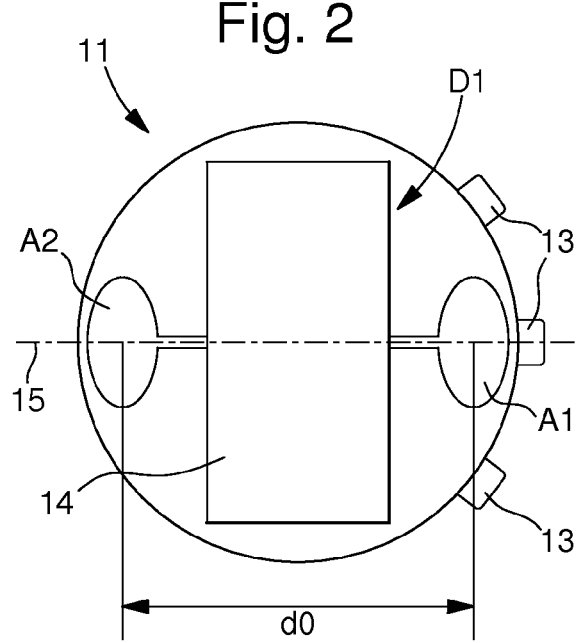
FIG. 2 shows schematically the search device D1, incorporated in a wristwatch.

In the particular embodiment illustrated in FIG. 2, the portable apparatus 11 containing search device D1 is an electronic watch, in particular a wristwatch, having manual control members 13, such as push buttons and/or a control stem and/or a touch sensitive crystal. The electronic unit 14 of the search device is housed inside the sealed case of watch 11 and can be powered by the same battery as the watch. Because of the very high frequency (on the order of 3.1 to 10 GHz) used in UWB, the size of the antennae is very small. Microstrip antennae can notably be used. Antennae A1 and A2 have diametrically opposite locations, so that the distance d0 separating them measured along axis 15, which passes through the central point of each of the two antennae, is as large as possible. Depending upon the constituent material of the case, the antennae could be housed with the timepiece components inside said case. A value of d0 of between approximately 3 and 4 cm is entirely compatible with the usual size of a wristwatch and with the precision necessary for the measurements and calculations described below. It will be noted that the UWB standard obtains precision of the order of magnitude of a millimeter.

As stated above, one of the advantages of incorporating search device D1 in a watch is that it is permanently available, since the user generally wears the watch all day. Another advantage lies in the possibility of using the usual display members of an electronic watch for the indications provided by the search device, insofar as the watch has an analogue time display, which can indicate directions using hands. A digital or alphanumerical display, provided for example for indicating the date or a measured time, can indicate the distance from the object sought, but this distance could also be indicated in an analogue manner, for example by means of a chronograph counter hand. Thus, there is a high level of synergy between the search device and the wristwatch, since the sealed case, the electric power source, the display means, the manual control means and the bracelet or strap for attachment to the user's wrist are all shared.

Figure 6:
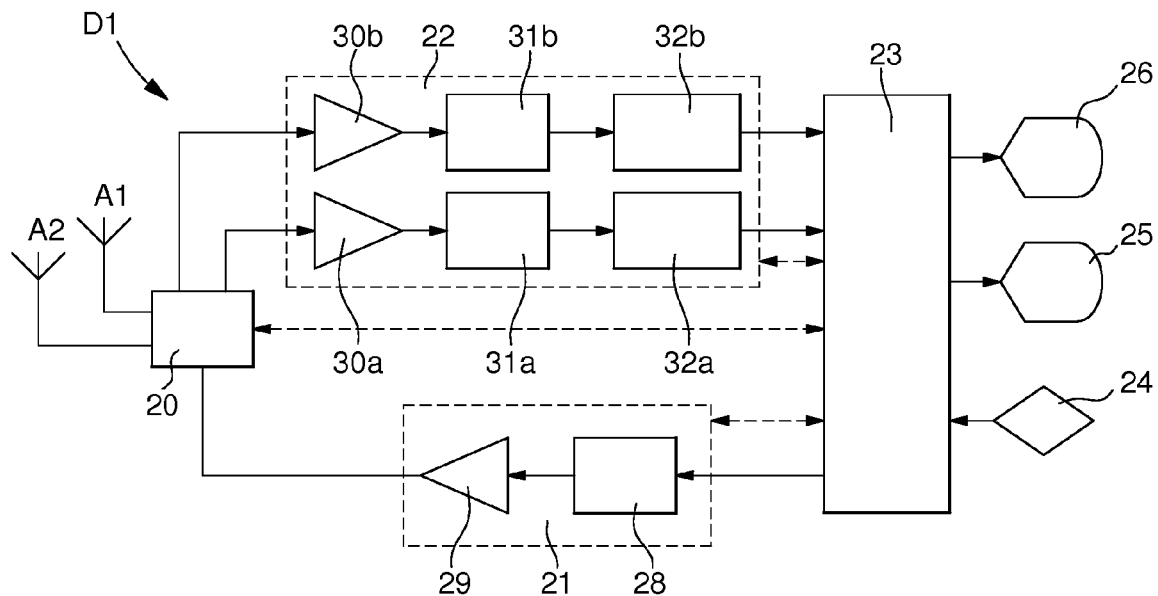
FIG. 6 is a block diagram of search device D1.

Reference will be made to FIG. 6 to describe an embodiment of the electronic circuit of search device D1. Antennae A1 and A2 are alternately connected to a UWB transmitter module 21 and to a UWB receiver module 22, via a transmission/reception switch 20 (optional). Modules 21 and 22 are connected to a digital processing unit 23, connected in turn to an entry key 24, to an analogue display 25 and to a digital display 26, with displays 25 and 26 also being used to display the time and other time-related values in watch 11. Entry key 24 is a manual command, for example actuated by one of push buttons 13 of the watch or by a touch sensitive crystal.

The UWB transmitter module 21 includes a UWB pulse generator 28 and an amplifier 29 whose output signal simultaneously reaches the two antennae A1 and A2 via a switch 20. The UWB receiver module 22 includes two parallel chains respectively receiving the signals from antennae A1 and A2 and each including an amplifier 30a, 30b, an energy detector 31, 31b and a demodulator 32a, 32b which delivers its output signal to digital processing unit 23. Unit 23 coordinates the operation of elements 20, 21 and 22 by the digital connections shown in dotted lines, performs the operations described below for calculating the position of the object sought and controls displays 25 and 26 to indicate this position.

Figure 7:
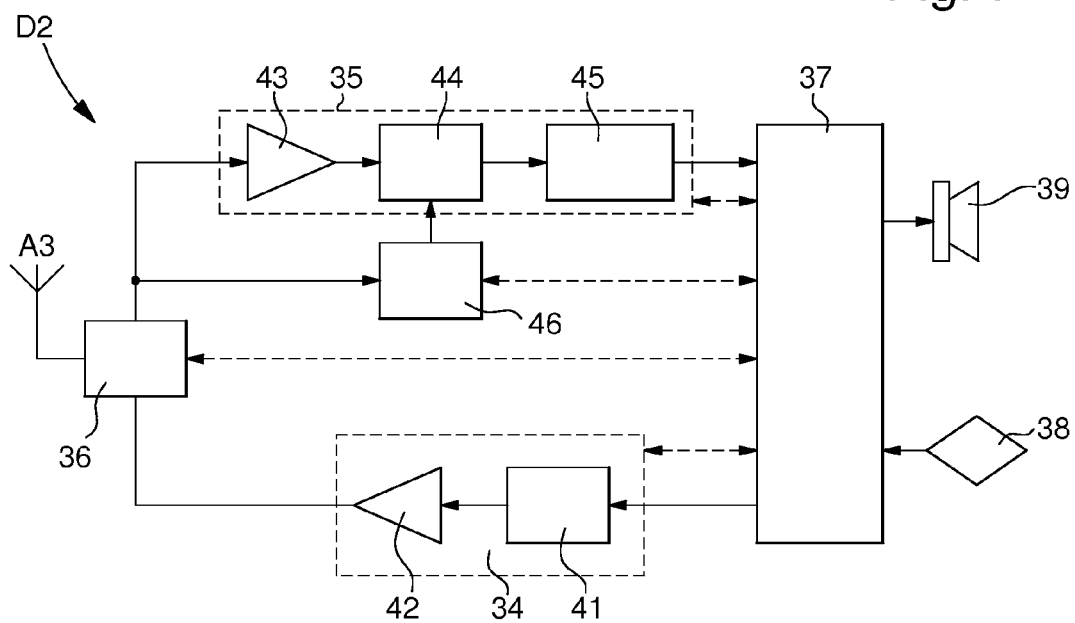
FIG. 7 is a block diagram of target device D2.

With reference to FIG. 7, the electronic unit of target device D2 includes a UWB transmitter module 34 and a UWB receiver module 35, which are alternately connected to antenna A3 by a transmission/reception switch 36. Modules 34 and 35 are connected to a digital processing unit 37, connected in turn to an entry key 38 and, optionally, to an acoustic transducer 39. The UWB transmitter 34 includes a UWB pulse generator 41 and an amplifier 42 whose output signal reaches antenna A3 via switch 36. UWB receiver module 35 includes an amplifier 43, an energy detector 44 and a demodulator 45, which delivers its output signal to digital processing unit 37. This unit 37 coordinates the operation of elements 34, 35 and 36 by digital signals on the connections shown in dotted lines, performs the operations described below for transmitting UWB signals in response to the received signals, and produces a warning signal to be diffused by acoustic transducer 39 if the latter is present.

To ensure that D2 consumes very little energy in the standby state, it includes an wake-up receiver 46, which also receives the signals picked up by antenna A3 and only switches on receiver module 35 after receiving an encoded wake-up signal. The structure and function of this type of wake-up receiver are known. An example embodiment is described in the article entitled <<A 2 GHz 52 µW Wake-Up Receiver With −72 dBm Sensitivity Using Uncertain-IF Architecture>>, par N. Pletcher et al, 2008 IEEE International Solid-State Circuits Conference, Digest of Technical Papers, p. 524-525. The basic structure is very simple. It is an envelope detector calibrated at the desired frequency. The received wake-up signal is an amplitude modulated signal, with a data sequence (code) identifying the device to be woken up. Since demodulation is very simple, the structure uses very little energy. The power provided by a miniature battery can keep this type of receiver on standby for a period of several years, depending upon the duty cycle selected.

Module 37 further includes a non volatile memory which stores the code representing the identity of the target device D2, so as to distinguish it from other similar target devices D3, D4 etc. capable of being located by means of the same search device D1. This D2 identity code must be stored in a memory of D1 during a declaration operation, controlled for example by a combination of actions on entry key 38, before the search device can be used to locate the target device. The same is true for the identity codes of the other target devices D3, D4 etc. that one might wish to add to the system.

Figure 8:
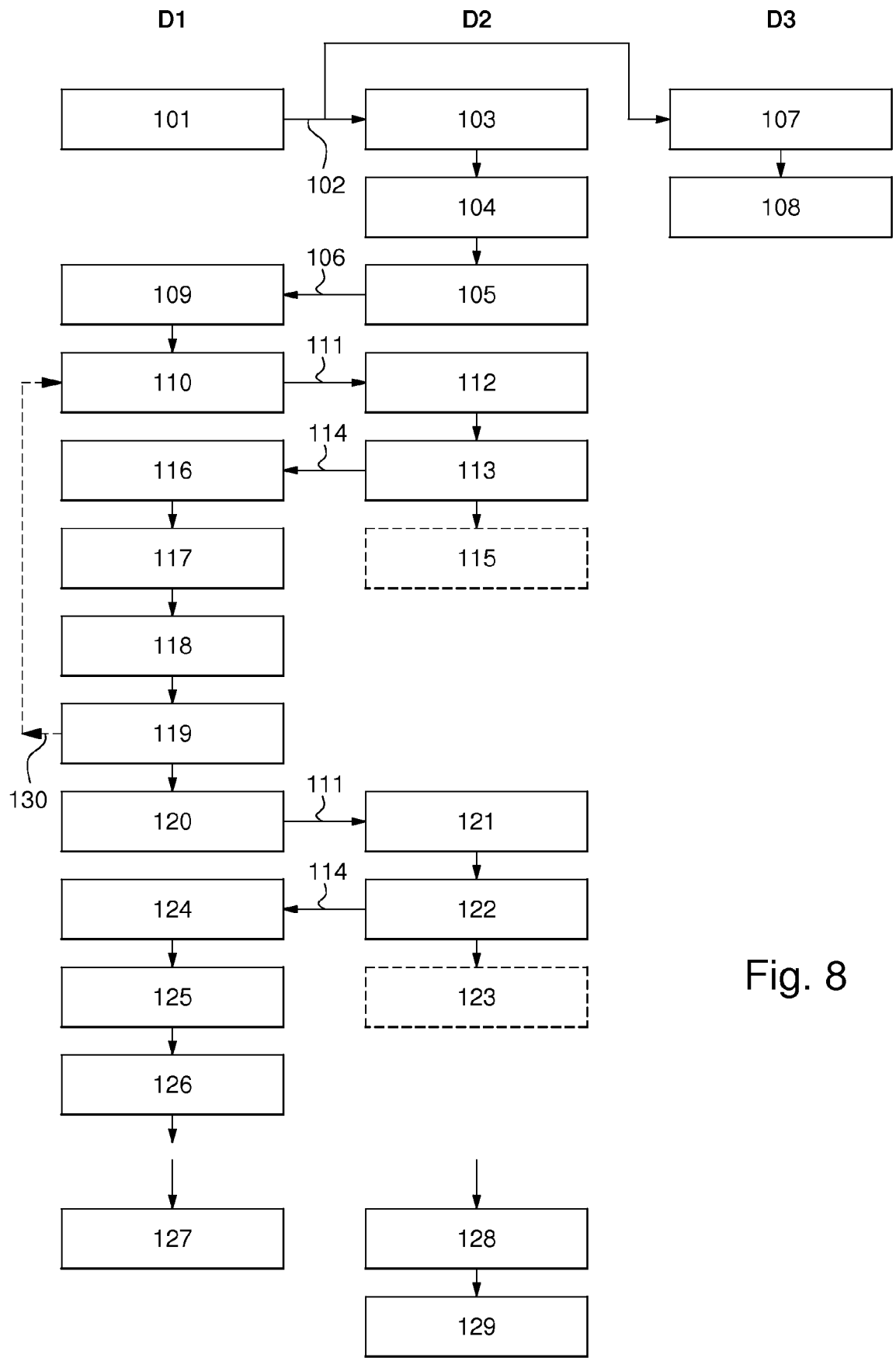
FIG. 8 is a diagram of the operating steps of the system of FIGS. 1 to 7 for an object location operation.

The operation of the system for locating object 12 linked to target device D2 will now be described with reference to FIGS. 3 to 8. The diagram of FIG. 8 shows the operational steps carried out in or by devices D1, D2 and D3 (if the latter is present in proximity) for an operation of locating object 12.

In the first step 101 that the user starts by suitable activation of control members 13 (see FIG. 2) of watch 11, search device D1 emits a wake up signal 102 containing the identity code of target device D2. The latter receives and recognises signal 102 in step 103 by means of its wake up receiver 46, which switches on the rest of the electronic circuit of D2 in step 104. In step 105, D2 emits an acknowledgement of receipt signal 106 which also contains its identity code. During this time, the other target device D3 has also received, in 107, the wake up signal 102, since it was quite close by, but the D3 wake up receiver does not recognise its identity in this signal, thus D3 remains inactive in 108.

Search device D1 receives signal 106 in step 109 and then starts a first location sequence, by a step 110 consisting in elaborating and simultaneously emitting a locating signal 111, also containing the identity code of D2, across its two antenna A1 and A2 as shown in FIG. 5, at an instant tini that starts a countdown in clock circuit 50 of D1. Let us assume that, at that moment, antenna A3 of the target device is closer to antenna A1 than to antenna A2, i.e. the travel time t1 of locating signal 111 between A1 and A3 is shorter than the travel time t2 between A2 and A3. In step 112, target device D2 receives the signal 111 from antenna A1, at an instant tpktRx1 (see FIG. 5), which resets its clock circuit 51, then it receives the same signal 111 from antenna A2 at instant tpktRx2 and measures the time difference tdiff=t2−t1 between these two receptions. In step 113, D2 elaborates and emits at instant tpktTx3 (see FIG. 5) a return signal 114, which contains the time difference tdiff and a processing duration tproc which is the time interval between tpktRx1 and tpktTx3.

As an option, D2 may perform a step 115 consisting in emitting an acoustic signal via the acoustic transducer 39 thereof, to assist in locating the object sought audibly if conditions allow. In a variant, the duration of processing may correspond to the period of time between the second received signal and the return signal. It should be noted that it is possible, in another implementation of the location method, for the processing time to be predetermined. By knowing the possible travel time differences and the duration of data processing by the target device up to the transmission of the return signal, it is possible to define a fixed processing period which is sufficient and to arrange the target device so that it always sends its return signal exactly after this fixed period. In this variant, there is no need to transmit data relating to this fixed period in the return signal, since it can be introduced beforehand in a non-volatile manner in the search device.

In step 116, search device D1 receives return signal 114 firstly at an instant tfin1 (see FIG. 5) via antenna A1 thereof which is closest to antenna A3. This reception actuates a switch which temporarily isolates antenna A2 from its UWB receiver, so that the latter is not operating at instant tfin2 when the same signal will be received by antenna A2, so as to reduce the power consumption of D1. In digital processing module 23 of D1, the value tdist=tfin1−tini is measured by a clock circuit.

In step 117, module 23 of D1 calculates the travel times:

$$t1 = (t\text{dist} - t\text{proc})/2$$

$$t2 = t1 + t\text{diff}$$

which represent the corresponding distances d1 and d2 between antenna A3 and each antenna A1 and A2. The module then calculates, by triangulation in the plane of the three antennae from values d0, d1 and d2, the polar coordinates of the possible position or positions of antenna A3 and thus of the object sought 12 with reference to the watch and the axis 15 thereof, then operates a corresponding visual indication by display means 25 and 26 of watch 11 in step 118. It will be noted that if t1>t2, indices 1 and 2 should be swapped in the above formulae. It will also be noted that this method may be carried out in a similar manner using the D1 antenna which is the second to receive the return signal.

Figure 3:
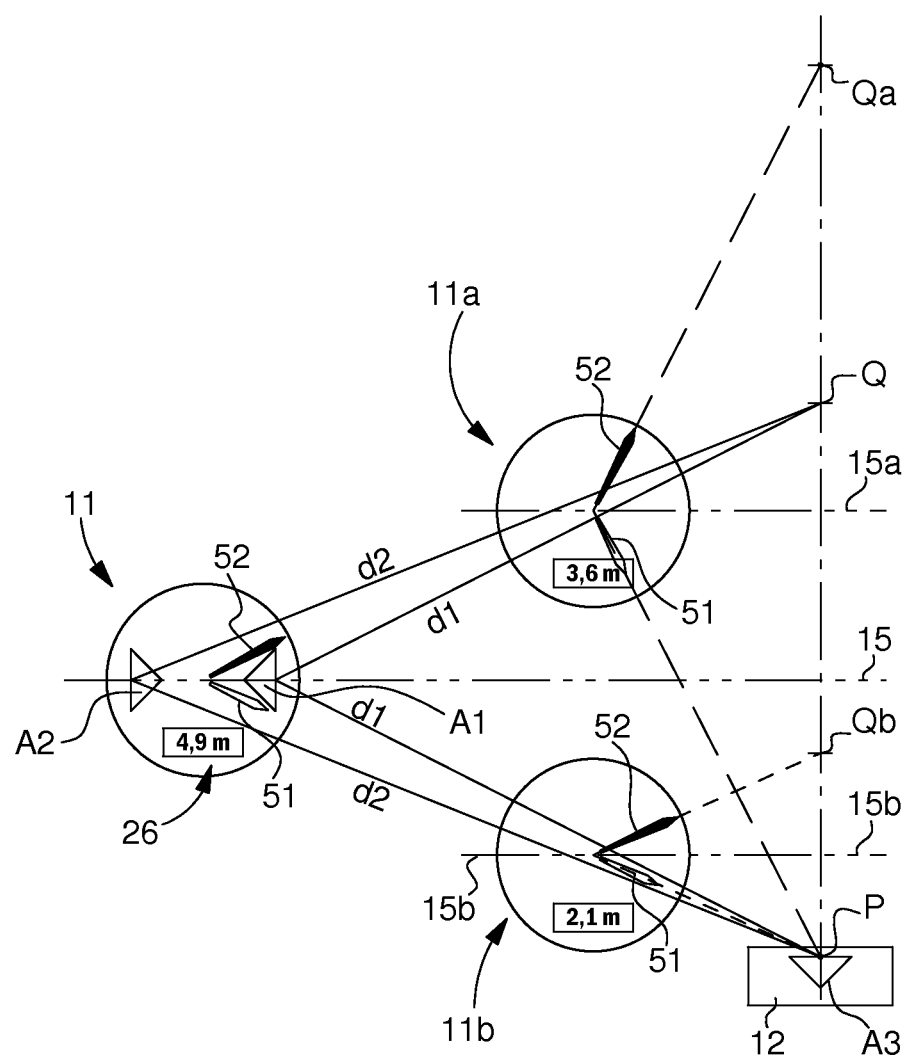
FIG. 3 shows schematically various steps in the location method in an operating mode wherein the search device is translated.

Generally, the absolute value of d2−d1 is less than d0 and the aforementioned triangulation calculation provides two possible symmetrical positions relative to axis 15, referenced P and Q in FIG. 3. In the present example, the respective directions of these positions are indicated by hour hand 51, minutes hand 52 of analogue display 25, whereas the common distance (4.9 m here) is indicated by digital display 26. Evidently, at least one additional measurement is required to remove any ambiguity, after a movement has been imparted to search device D1 in step 119 to place it in a new position in which it will carry out said measurement. For example in FIG. 3 the new position 11a is achieved by a movement of translation. It will be observed that the technology selected within the scope of the present invention, namely UWB technology, is a particularly appropriate choice because a UWB receiver is capable, according to UWB standard IEEE 802.15.4a, of distinguishing between the reception of two signals as soon as they are more than 15 ps (picoseconds) with a bandwidth of 499.2 MHz (this temporal distance may be further reduced with a larger bandwidth). Thus, the difference between d1 and d2 only has to be at least 5 millimeters for the receiver provided in device D2 to be able to identify the reception of the two signals on the single antenna A3 thereof. The invention is characterized in that, even with a small distance between the two antennae A1 and A2 of device D1, the reception of two signals, simultaneously emitted by the two antennae, are managed by the same single receiver associated with a single antenna in device D2. This means that less power is consumed, the time difference between reception of the two signals can be calculated using a straightforward electronic circuit and the determination of the time difference can be very precise.

However, it will be noted that when antenna A3 comes close to a perpendicular position to the direction of alignment of antennae A1 and A2, the single receiver provided in D2 is not longer able to distinguish the reception of the second signal correctly. At least two variants can be envisaged to respond to this particular problem within the scope of the invention. In a first variant of the location method, the user rotates search device D1 at a certain angle, notably at least 30 degrees, after having given the search command. The locating signal is simultaneously emitted by the two antennae A1 and A2 repeatedly at a given time interval. As soon as a valid return signal is received, the locating signal transmission ends. Otherwise, the transmission ends after a certain period of time and a non detection message is given to the user. In a second variant, a single locating signal is sent by the two antennae A1 and A2. In the event of failure to locate, before concluding that the object sought is absent, the user has to rotate the search device at least by a certain angle and again actuate the control device to generate the emission of a new locating signal in a new spatial configuration. If the object sought is in the locating area, the search device will then be able to detect its position according to the method of the invention. Another variant, which may also be combined with one of the two preceding variants, envisages the receiver being able to recognise, at least in certain cases, the reception of at least one of the two signals whose separation in time it cannot determine and it then sends a specific message to the user to invite him to rotate the search device before another locating signal is transmitted, automatically or after the control means are actuated again.

To perform the aforementioned additional measurement, to determine unambiguously the direction of the object sought from among two possible directions resulting from processing a first return signal, FIG. 4 shows an embodiment of said movement in the form of a limited rotation of watch 11 in the plane of the dial thereof, so as to change the orientation of the reference axis 15 thereof without any translation, and thus without changing place. To simplify the drawing, watch 11 is represented only by the pair of antennae A1 and A2. The frame of reference in the drawing is the Earth. The two possible positions of the object according to the first measurement are indicated by points P and Q.

After a limited rotation w of watch 11, for example clockwise, the new positions of the antennae define a new position of the reference axis 15' thereof, so that the coordinates stored for points P and Q define points P' and Q', angularly shifted from w by P and Q. Device D1 then performs a second locating sequence, including steps 120 to 125, which are similar to steps 110, 112, 113, 115, 116 and 117 of the first sequence, but with complementary calculations in step 125. This sequence is preferably started automatically, after a delay of between, for example, several tenths of a second and several seconds after step 117 but it could also be carried out by manual command. As the real position of the object sought 12 has not changed on Earth, the triangulation calculation performed in D1 provides, in general, as before two possible positions of the object sought 12, indicated here by points S and T. The point representing the position of object 12 is that which in practice coincides with P or Q, thus S which coincides with P in the case of FIG. 4. In the reference system based on axis 15', D1 has to select, in step 125, which of points S and T is angularly shifted by −w relative to P' and Q' respectively. It then operates a visual indication of the position of the object sought 12 by the watch display means in step 126, the direction of this position being indicated by the two superposed hands 51 and 52, whereas the distance is indicated by the digital display 26.

Distinguishing between S and T according to the direction of angular shift of each point, respectively from P' and Q', requires indicating to search device D1 the direction of rotation that watch 11 undergoes between the two locating sequences. A simple and economical solution consists in prescribing the direction of rotation in the operating instructions, for example clockwise. Otherwise, a gyroscope could be incorporated in D1, but this would involve a relatively expensive complication and an increase in power consumption. However, the gyroscope would allow the direction of the hands to be maintained relative to the environment when the orientation of the watch changes after the measurement.

If, for any reason, it was not possible to distinguish between S and T, D1 could store their coordinates instead of those of P and Q, and then carry out a new locating sequence from step 120. However, when the display has been performed normally in step 126, the search is deemed finished and D1 stops automatically at 127. An end of search command is performed in target device D2 in step 128. This may occur automatically, for example by timing, or by a manual action on entry key 38. D2 is then in a standby state again in step 129 where only the wake-up receiver is switched on.

In a variant, another operating mode of search device D1 can be provided, with periodic repetition of the locating sequence in different successive positions of watch 11, while the user himself interprets the movements of the watch hands relative to the environment. There is no need to perform steps 120 to 127. The continuous repetition of the locating sequence is optionally represented by arrow 130 in FIG. 8 and may be performed, for example, at a rhythm on the order of a half second to a second. The new sequence (steps 110 to 118) overwrites the stored data positions and leads to the display of a new distance and (generally) two new possible directions of the object sought 12. It falls on the user to observe the movements of the two hands and deduce therefrom which indicates a relatively constant position in space: it is this direction which corresponds to the true position of the object sought. Thus, it is not indispensable for the search device to be arranged to determine which of the two directions is the right one, since the user can do this himself by observing how the display changes.

Interpretation may be facilitated when the user moves the watch in the direction of one of the hands: if this hand remains in the same direction in space, it is because the watch is moving towards the object sought. This operating mode is shown in FIG. 3. If the user, starting from the initial position of watch 11, moves the latter in the direction of the large hand 52 as far as 11a, the new locating sequence will move both hands, such that the small hand 51 is pointing in this case towards the real position P of object 12 and the large hand 52 is pointing towards the symmetrical point Qa of P relative to the new situation 15a of the reference axis. When he sees that both hands have changed direction, the user has to deduce that the translation was not made in the right direction. If, conversely, he moves the watch in the direction of small hand 51 from 11 to 11b, this hand, pointing towards P, does not change direction, and it can be deduced therefrom that the translation was correctly made in the direction of object 12. In such case, large hand 52, pointing towards the symmetrical point Qb of P relative to position 15b of the reference axis, only rotates if the orientation of the axis changes. Here too, the user may pivot the watch until the two hands are superposed. He will then have to end the locating repetitions by manual action on the control members of the watch.

A similar operating mode is applicable with movements of rotation with no translation. In the example of FIG. 4, the clockwise rotation has had the effect of moving the two hands apart, to point towards S and T. If, conversely, the user had rotated them slowly anticlockwise, the two hands would gradually have moved closer together during the locating sequences, until they were superposed, thereby showing the true direction of the object sought 12.

It is important to note that the operating mode described above is not limited to movements of pure rotation or pure translation of the watch, since it can still be used when the watch makes a combination of translations and rotations. For the user to interpret the movements of the hands correctly, the watch dial need only remain within approximately the same, for example, horizontal plane.

Figure 9:
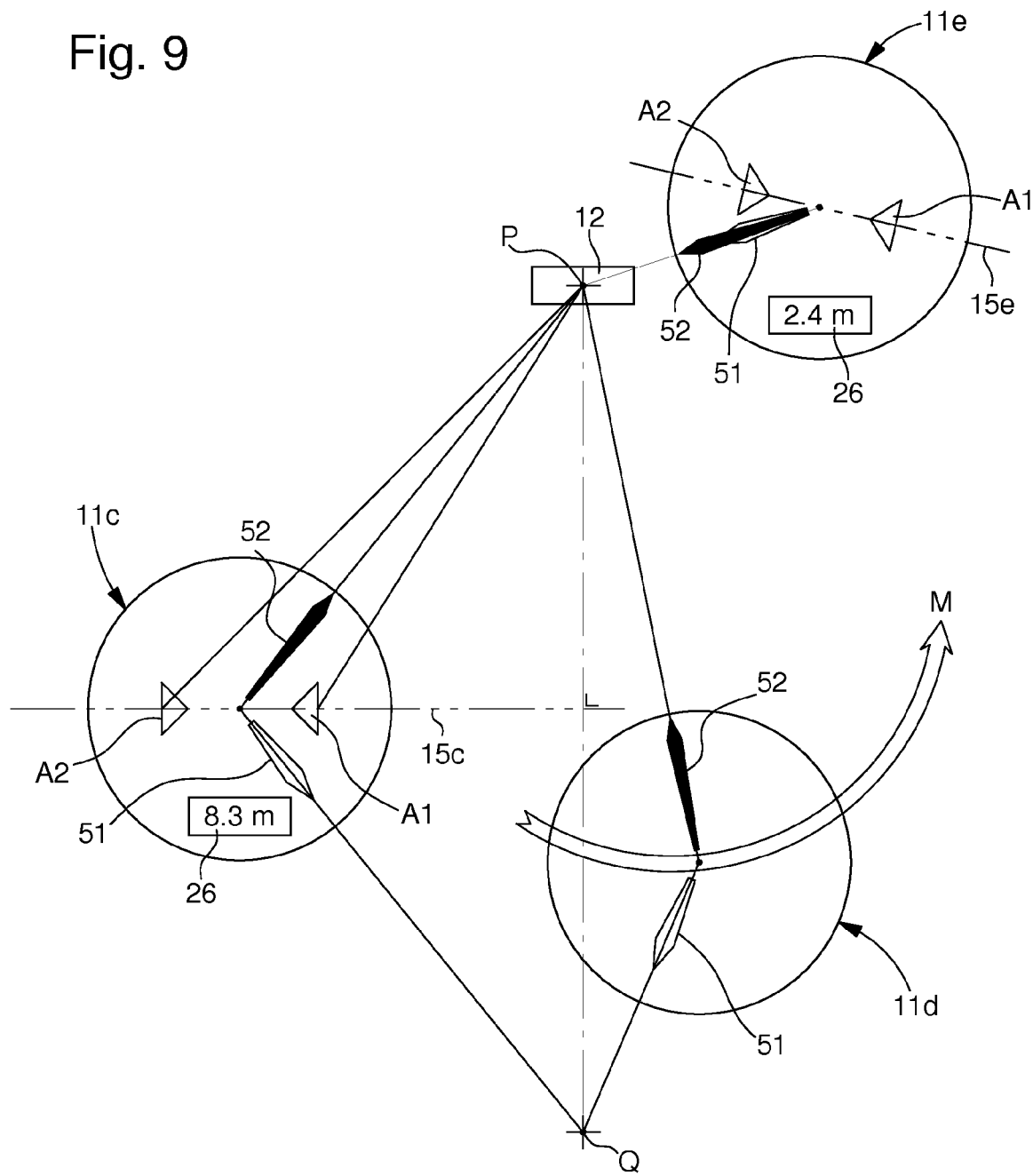
FIG. 9 shows schematically successive steps of the location method, in a variant wherein the search device contains an accelerometer.

According to another embodiment of search device D1, which is not described in detail here, the device may be provided with an inertial unit including, for example, an accelerometer with at least two axes and a gyroscope, in order to calculate the movements to which the watch is subjected in the plane of the dial, which is generally kept horizontal. When there is a new locating sequence, this allows the device to convert the coordinates of the two points stored in the preceding sequence into coordinates in the displaced frame of reference and to compare them to those of the two new points in order to find which has not moved. The operating mode of this device is illustrated in FIG. 9. A first locating sequence with watch 11 stationary in position 11c provides the coordinates of points P and Q in the reference frame of the watch, wherein P is the position of the antenna of target device D2 attached to object 12, while Q is the symmetrical point of P relative to the position 15c of the reference axis of the watch.

While the user is imparting a movement M on the watch, the search device periodically measures the components of this movement by means of the accelerometer and the gyroscope, recalculates the coordinates of P and Q relative to the new position of its reference frame and orients hands 51 and 52 accordingly as is seen in intermediate position 11d. A second locating sequence, similar to that described with reference to FIG. 8 is then automatically or manually started in any position 11e of the watch. This sequence allows search device D1 to distinguish between the real position P of object 12 and that of the symmetrical image thereof relative to the current position 15e of the reference axis, and to indicate the direction of the object by superposing the two hands 51 and 52 while indicating the distance on digital display 26. The user therefore knows where the object is located and may, if he wishes, continue the search more closely via UWB or end the search.

The above description shows that the invention provides a location system that can be integrated in very compact apparatus, such that the target devices can be discreetly attached to the objects to be located and a user can easily keep the search device with him in case of need. The search device is not necessarily combined with a watch. One could envisage incorporating it in an apparatus intended solely for this use or in another portable apparatus containing an electric power source, electronic circuits and display means capable of indicating two directions and a distance, for example a mobile telephone or a nomad satellite positioning device.

The invention claimed is:

1. A method of locating an object sought, by means of electromagnetic signals exchanged between a search device incorporated in a portable apparatus and a target device attached to the object, wherein the search device includes a transceiver associated with a pair of antennae that are spaced apart from each other, a display means, and an electronic means for managing the transceiver and the display means, wherein the target device includes a transceiver associated with an antenna and with an electronic means capable of detecting the reception of signals originating from the search device,
wherein the signals are UWB signals, and wherein the method includes
a locating phase including at least one locating sequence, wherein the locating sequence includes the steps of
a) emitting two respective locating signals across the two antennae of the search device, wherein he search device emits the two locating signal;
b) measuring a time difference between reception of the two locating signals, wherein the target device receives the two locating signals and measures a time difference between reception of the two signals;
c) encoding and emitting a return signal containing an indication relating to the time difference, wherein the target device encodes and emits the return signal;
d) receiving and decoding the return signal at least across one of the two antennae of the search device, wherein the search device receives and decodes the return signal;
e) measuring at least a total time between the emission of one of the two locating signals and reception of the return signal by one of the two antennae of the search device and calculating both travel times, of the two locating signals, between, respectively, the two antennae of the search device and the antenna of the target device on the basis of the total time, the time difference, and a processing time between one or the other reception of the two locating signals by the target device and the emission of the return signal by the target device;
f) calculating at least a direction or two possible directions of the object by triangulation, based on the two travel times and the space between the two antennae of the search device; and
g) displaying at least the direction or the two possible directions of the object.

2. The method according to claim 1, wherein a duration of processing between the first reception or the second reception of the locating signal and the emission of the return signal is determined by the target device and transmitted by the target device in the return signal, wherein the search device is disposed to decode the duration of processing.

3. The method according to claim 2, wherein the at least one locating sequence is repeated periodically or on request.

4. The method according to claim 3, wherein a movement is imparted to the search device before a repetition of the at least one locating sequence and the change in the display is observed after the repetition.

5. The method according to claim 4, wherein the movement is a rotation of the search device on itself or a translation in the direction of one of the two possible positions.

6. The method according to claim 4, wherein, in the search device the coordinates of the possible positions supplied by a first locating sequence are stored, the movements of the search device are measured, the coordinates of the possible positions and the display of the possible positions are updated according to the movements, and wherein the possible positions calculated in a second locating sequence are compared to those of the first locating sequence in order to make a choice between the possible positions.

7. The method according to claim 1, wherein the method includes a wake up phase prior to the locating phase, and wherein the wake up phase includes the steps of:
a) activating the target device by means of a wake up signal containing an identity code of the target device, wherein the search device sends the wake up signal; and
b) responding to the wake up signal with an acknowledgement of receipt signal, wherein the target device responds to the wake up signal.

8. The method according to claim 2, wherein the method includes a wake up phase prior to the locating phase, and wherein the wake up phase includes the steps of:
a) activating the target device by means of a wake up signal containing an identity code of the target device, wherein the search device sends the wake up signal; and
b) responding to the wake up signal with an acknowledgement of receipt signal, wherein the target device responds to the wake up signal.

9. The method according to claim 1, wherein the duration of processing between the first reception or the second reception of the locating signal and the emission of the return signal is a predetermined value.

10. The method according to claim 1, wherein the two locating signals are emitted simultaneously.

\* \* \* \* \*